Figure 2:
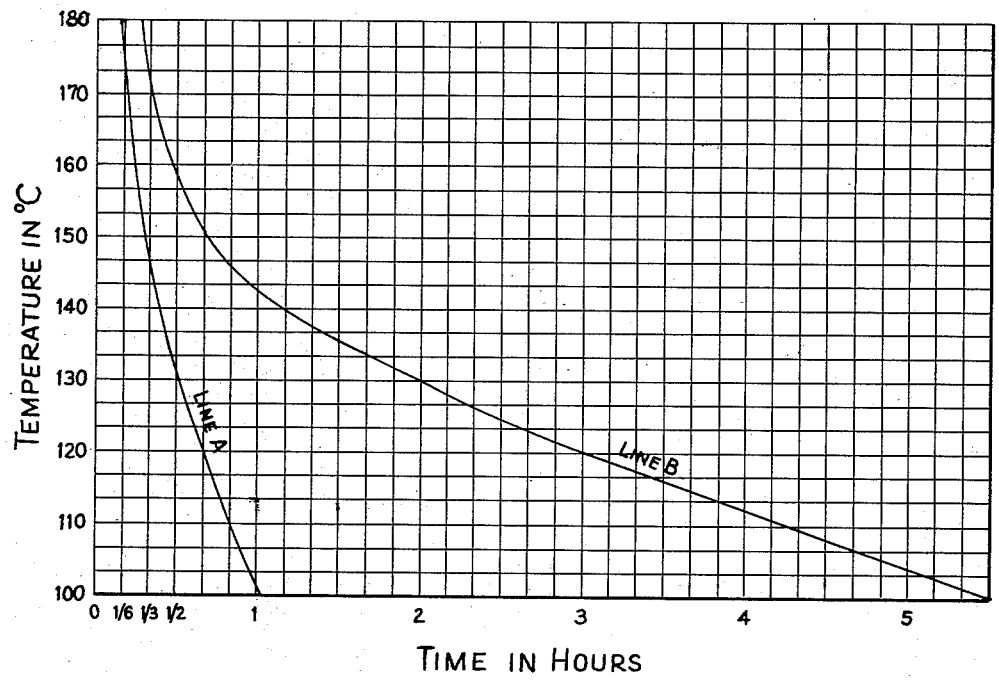

May 17, 1966 W. E. COOLEY ETAL 3,251,800
PROCESS FOR PREPARING CURED PARTICULATE MELAMINE-FORMALDEHYDE
CLEANING AGENTS
Filed Oct. 28, 1960

INVENTORS
BY WILLIAM E. COOLEY,
PAUL L. VANDENEYNDEN
ATTORNEY Richard C. Witte

United States Patent Office 3,251,800
Patented May 17, 1966

3,251,800
PROCESS FOR PREPARING CURED PARTICULATE MELAMINE - FORMALDEHYDE CLEANING AGENTS
William E. Cooley, Wyoming, and Paul L. Vanden Eynden, North College Hill, Ohio, assignors to The Procter & Gamble Company, Cincinnati, Ohio, a corporation of Ohio
Filed Oct. 28, 1960, Ser. No. 65,679
8 Claims. (Cl. 260—39)

This invention relates to small ellipsoidal particles of highly polymerized melamine-formaldehyde resin and a process for making such particles which are highly useful as a cleaning agent, particularly in dentifrices.

In copending application Serial No. 850,533, filed November 3, 1959 now U.S. Patent 3,070,510, dentifrice compositions are described which utilize, as the essential cleaning and polishing agent, finely divided, highly polymerized thermosetting resins including, as the preferred resin, melamine formaldehyde resins. These melamine-formaldehyde resins are particularly desirable as cleaning agents for dentifrices not only because of their excellent cleaning effectiveness but also because of their high compatibility with such advantageous dentifrice ionic ingredients as stannous fluoride. These resins have superior cleaning and compatibility advantages over the mineral abrasives commonly used in dentifrices and other cleaning products which contain a particulate abrasive. Melamine-formaldehyde resins also have superior odor and color characteristics relative to other resinous cleaning agents, particularly when used in dentifrices.

To obtain the melamine-formaldehyde resins having the properties desired for an effective cleaning agent it was found to be necessary to cure the resin to a highly polymerized state. The manner in which such a cure is effected is to heat the resin with or without preliminary acidification at elevated temperatures for a relatively long period of time. Such a treatment results in a hard block of resin which has a desirable ionic compatibility but which has to be laboriously ground to achieve the particle size necessary for use as a cleaning agent in dentifrices. After grinding, the cleaning properties are satisfactory; but the particles have sharp edges which have a tendency to excess abrasiveness unless a substantial amount of grinding is done.

A method for effecting the desired high degree of polymerization for melamine-formaldehyde resinous cleaning agents and for producing them in particulate form, free from sharp edges, was sought in the known technique of polymerizing melamine-formaldehyde resins in aqueous solution by addition of acid. However, when such a technique is used in an unsophisticated manner and in accordance with the prior art teachings, a hard block gel results which must be laboriously broken up with the accompanying disadvantages described above. A hard block gel is a gelatinous network of hard resinous particles containing a substantial amount of water; however, the particles have firmly grown together during the gel formation much like sintered powdered metal. Such a gel can be broken up with difficulty, only into sharp-edged particles, either before or after drying. Acidulation methods have been proposed for making dispersions of melamine-formaldehyde resins which are true solutions or are colloidal in nature, and which are used for treating textiles and paper; however, particulate cleaning agents having desirable characteristics do not result from such processes.

It is an object of this invention to provide finely divided ellipsoidal particles of a highly polymerized melamine-formaldehyde resin which are especially suitable as a cleaning agent, particularly in a dentifrice containing ionic ingredients.

It is another object of this invention to provide a process for making such particles.

It is another object of this invention to provide appropriate conditions, in a process for polymerization of a melamine-formaldehyde reaction product (resin) in aqueous solution by addition of acid, such that highly polymerized, ellipsoidal particles of resin are efficiently obtained, the particles being an effective cleaning agent preferably of high ionic compatibility.

It was found that these and other objects are achieved with particulate melamine-formaldehyde resins ellipsoidal in shape, having diameters in the range of about 1 micron to about 20 microns and which are produced by a process comprising the following steps (stated in broad terms): a water-soluble reaction product of melamine and formaldehyde (resin) is dissolved in water; this material is polymerized by the addition of acid to form a friable gel of small particles of melamine-formaldehyde reaction product in the desired size range; water is then removed from the gel; the small particles from the dried gel in the form of agglomerates are then broken up and preferably heat cured. The conditions of the process, particularly the temperature and the proportions of the water and acid, are very important, as hereinafter more fully described, to achieve the production of particles in the desired size range in the form of a gel which is then broken up, preferably for subsequent heat curing. Certain additives can be included in the solution of the melamine and formaldehyde reaction product as hereinafter more fully described.

Figure 1:
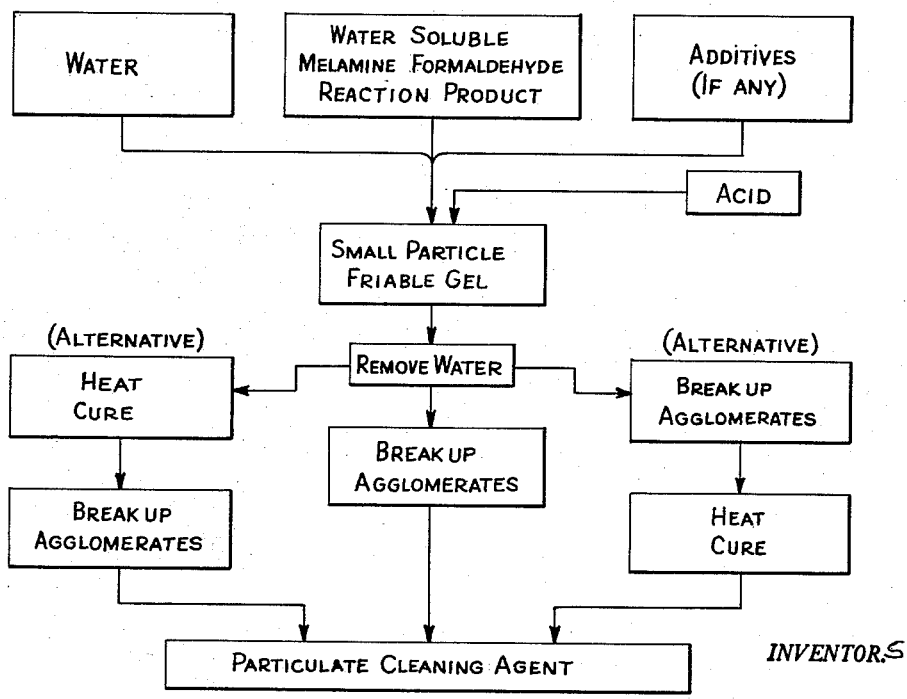

FIGURE 1 of the drawing is a flow chart of the process of this invention. FIGURE 2 of the drawing is a graph showing the minimum curing times and temperatures of the preferred aspects of the process as hereinafter more fully described.

As used herein the term "ellipsoidal" is intended to include both spheroidal and ovoid particles.

The gel formed in the process of this invention is a water-filled, jelly-like network of particles. The gel is soft and gelatinous in appearance, usually somewhat like cottage cheese. The gel is friable, i.e., the particles adhere together much less firmly than the particles in a hard block gel.

The starting material to be used in making the particulate cleaning agent of this invention is a water-soluble melamine-formaldehyde reaction product (resin). This reaction product can be partially polymerized, but the degree of polymerization should not be so great as to remove it from the water-soluble range. In the process of this invention, this reaction product is subjected to polymerization to a water-insoluble state under very particular conditions, as hereinafter described, to obtain the highly effective particulate cleaning agent of this invention. The melamine-formaldehyde reaction product starting material should contain about 2 to about 4 moles of combined formaldehyde for each mole of melamine in order to obtain, from the process, a cleaning agent of the desired properties, i.e., high cleaning ability with relatively low abrasiveness and preferably a high ionic compatibility.

The water-soluble starting material (melamine-formaldehyde reaction product) is not a definite compound but can be defined more specifically as a mixture of methylol melamines, from mono- to hexa-methylol melamine. The material usually contains some polymers of low molecular weight but a polymer content is not necessary. Such polymers are proucts of condensation reactions between pairs of methylol groups, or between methylol groups and amino groups. It is these condensation reactions that later in the process bind the methylol compounds and low polymers together, as polymerization proceeds, to the final three-dimensional high polymer characteristic of the cleaning agent of this invention. The starting material is commercially available as a dry powder, having been dried from the aqueous solution formed during its manufacture.

Although melamine formaldehyde reaction products are the preferred starting material, up to 80% by weight urea can be substituted for melamine and still realize, to a substantial degree, the advantages of the invention. However, when urea is substituted for the melamine there is some reduction in the outstanding cleaning properties and ionic compatibility of the cleaning agent described herein. Whenever melamine is used in the description of the product and process of this invention which follows, it is understood that up to 80% by weight urea can be substituted for the melamine with the changes in results described above.

In the first step in preparing the particulate cleaning agent of this invention, one part of the resinous starting material described above is dissolved in about 1 to 8 parts of water. (All parts and percentages used herein are by weight.) The concentration of the starting material in water is very important to the later steps of the process to the material finally obtained. If less water than indicated is used, solution of the resinous starting material can be difficult and the agglomerates of ellipsoidal resinous particles later obtained cannot be easily broken up. With still lower proportions of water an undesirable hard block gel forms. If amounts of water greater than above indicated are used, colloidal particles or true solutions are later obtained rather than the desired gels of ellipsoidal particles in the appropriate size range.

In the second step of the process, acid is added to the aqueous solution of resin in a sufficient amount and at a temperature such that the resin polymerizes in the form of a gel of ellipsoidal resin particles having a particle size in the range of about 1 micron to about 20 microns. In the case of mineral acids the amount of acid added should be equivalent, on a molar basis, to HCl in a molar ratio range of about 0.2 to about 0.5 mole of HCl per mole of melamine. In the case of organic acids and Brönsted acids the amount of acid added should be equivalent, on a molar basis, to acetic acid in the molar ratio range of about 0.35 to about 1.0 mole of acetic acid per mole of melamine. If less acid, than indicated in the respective acid categories, is used, gelation is slow and a non-homogenous gel containing very small particles and large irregular particles and a large excess of liquid phase is obtained. If an amount of acid greater than that indicated in the respective acid categories is used the particles are colloidal in nature (i.e., the particles are too small in size), and the gel can become the undesirable hard block gel. The particle size of the polymerized resin decreases with increasing concentration of acid within the ranges set forth for the respective categories. If the indicated acidulation conditions are observed, the particles of resin formed are surprisingly uniform in size.

The acid can be added in the form of an aqueous solution, e.g., concentrated HCl or HNO₃. However, the acid can be added in an anhydrous, or substantially anhydrous, form, e.g., glacial acetic acid or fuming or concentrated sulfuric acid. If water is added to the resin solution with the acid, it should be in an amount such that the total water in the acidified mixture is in the weight ratio range of water to resin of about 1:1 to about 8:1. The desired gelation is not achieved if the water to resin ratio is greater; the gels become too hard if the water to resin ratio is less.

The temperature of the acidification is important; it should be within the range of about 25° C. to about 100° C. Within this range, higher temperatures result in small particles and more uniform particle size. Regulation of temperature can be used to control these variables. Higher temperatures within the range usually result in faster reaction rates. If temperatures less than about 25° C. are used, the particulate resins formed contains some large, undesirably gritty particles and the texture of the gel is not predictable. The advantages of temperature control during acidification are particularly seen in the preferred range of 50° C. to 85° C. Increasing the acidification temperatures above about 100° C. does not appear to result in any process or product advantages.

In the preferred aspects of the process, the acid is added rapidly to the resin solution and agitated to a degree not more than that sufficient to provide a substantially uniform mixture, after which the internal movement of the mixture is desirably slowed or stopped, as for example by lowering a radiating set of baffle plates into the mixture. In a short time, usually less than a minute, the acidified liquid mixture turns opaque and a gel begins to form. Usually in about 5 to 15 minutes the gel is relatively firm, and can be cut up and removed from, or scooped out of, the reaction vessel.

The gel is formed of ellipsoidal particles, which in this preferred aspect are substantially spheroidal (approximately spherical), and which are in the size range of about 1 micron to about 20 microns. The particles are loosely agglomerated in the gel. The gelling of the acidified resin solution under the indicated conditions was examined microscopically, and it was quite surprising to observe that the spheroidal resinous particles formed do not grow toward each other and finally coalesce into the undesirable hard block gel. Instead, it was observed that gelling of the acidified resin solution begins at distinct points of nucleation in an otherwise clear medium. Gelling progresses by fairly rapid growth about these nuclei. The growth is not directional, and the growing particles are spheroidal. Surrounding the particles is the remainder of the solution which is of just the proper density to suspend the spheroids. Agglomerates of the particles are formed, but most of the agglomerates are very loosely bound and are mainly formed by chance juxtaposition. The gel is a water-filled, jelly-like, network of these agglomerates. A few more tightly bound agglomerates, consisting of about 10 to 20 spheroids form; but they are, for the most part, broken up with the loosely bound agglomerates later in the process, as hereinafter described, to form the cleaning agent having a particle size in the desired range.

Desirably, internal agitation of the acidified resin solution during gelling is avoided in order to avoid disruption of the suspension of particles being formed since such disruption permits undesirable rapid agglomeration of the particles followed by sinking of the larger agglomerates to form a hard crust at the bottom of the gel. However, ovoid particles can be formed if the entire acidified resin solution is gently stirred. Such stirring can be effected by use of a slowly rotated paddle immersed in the acidified solution. In such production of ovoid particles, the molar ratio of acid to melamine preferably is in the range of about 0.2:1 to 0.4:1. The gels formed when rotating the acidified resin solution are usually less firm than those gels obtained when the solution is stagnant.

Examples of the mineral acids which can be used in the process of this invention are hydrochloric acid, nitric acid, sulfuric acid, phosphoric acid, hydrobromic acid, hydroiodic acid and perchloric acid. Examples of organic acids which can be used in the process of this invention are acetic acid, formic acid, citric acid, tartaric acid, lactic acid, maleic acid, malonic acid and gluconic acid. Examples of Brönsted acids are $NH_4Cl$ $(NH_4)_2SO_4$, and other amine or weak basic salts of mineral acids. Mixtures of these acids can be used, including mixtures of mineral acids and organic acids and/or Brönsted acids in which the molar ratios are adjusted according to the indicated ranges.

The preferred acids are hydrochloric acid, nitric acid and sulfuric acid.

In the third step of the process, water is removed from the gel formed in the acid polymerization of the resin solution as described above. Water can be removed by pressing or filtering it from the gel and/or by drying the gel, preferably after separating it into smaller pieces. The gel is soft and jelly-like before removal of water; after removal of water, the gel crumbles to particles and agglomerates. It is usually desirable at this stage to remove impurities, such as excess acid or free formaldehyde, by dispersing the gel in water, either before or after drying, and then filtering the resin particles. Thorough drying can also be accomplished by spreading the gel in a thin layer and permitting it to dry in air or in an oven.

It has been found that a somewhat better combination of cleaning ability and low abrasiveness in the final particulate product is obtained if the gel is dried soon after the gelling step of the process.

As a fourth step in the process of this invention, agglomerates of the polymerized resin particles from the dried gel (the agglomerates ranging in size from about 2 microns to about 100 microns), are broken up to form the particulate resinous cleaning agent of this invention. Careful observance of the conditions of the process, as described above, provides a dried gel which is friable and which can be readily broken up into the desired final product. The breaking up of the agglomerates from the dried gel is accomplished by the usual comminution means such as ball mills, impact mills and the like. Ball milling is preferred. Comminution of the agglomerates is readily effected without fracturing the individual particles which are themselves very tough.

In the preferred aspects of this invention a heat curing is effected in the fourth step of the process either before or after the breaking up of the agglomerates. The order of comminution and heat curing does not appear to be important to the characteristics of the final product. However, if the particulate resin of the invention is reduced to its desired particle size before the heat cure, the efficiency of the cure is greater since maximum access of heat is provided with the easiest escape of volatiles (e.g., water vapor, unreacted acid and formaldehyde). On the other hand, if the heat curing is effected prior to the comminution, the removal of water from the gel (step three) can be accomplished in the same operation as the heat cure. In such a case the water is driven off first and then the actual curing takes place. Comminution is preferably carried on until substantially all of the agglomerates are smaller in size than about 30 microns, preferably smaller than about 20 microns.

Particles larger than about 20 microns and agglomerates larger than about 30 microns tend to feel gritty in the mouth and to stick between the teeth when used in a dentifrice. Particels finer than about 1 micron are relatively ineffective as a cleaning agent.

When curing is included in step four, as is preferred to obtain optimum compatibility characteristics as hereinafter described, both the time and temperature of curing are important. (Curing is further polymerization of the resin which has already been highly polymerized in the acidulation step.) Curing should be effected at a temperature not less than about 100° C. in order to obtain a significant degree of curing and at a temperature not greater than about 180° C. to avoid any tendency for decomposition or discoloration of the resin. The time necessary to effect the desired degree of curing varies inversely with the temperature within the above range, i.e., the higher the temperature, the shorter is the minimum time necessary to effect the desired degree of cure (polymerization).

A particulate resin with a high degree of cleaning utility and acceptable ionic compatibility can be obtained by the acid polymerization of step two. However, it is preferred to heat cure in the fourth step of the process not only to insure a high degree of cleaning ability but also to provide a particulate resinous cleaning agent with a high degree of ionic compatibility with dentifrice ingredients with which the cleaning agent is desirably associated, e.g., stannous fluoride.

Therefore, as the guide used to measure the ionic compatibility of heat-cured resins, the following test is used:

A solution is prepared which consists of 250 parts of glycerine, 250 parts of water and 4 parts of stannous fluoride. To 25 parts of this solution is added 20 parts of the cleaning agent to be tested for stannous ion compatibility and 5 parts of water. In the blank (or control) sample, 25 parts of water free from cleaning agent is added to 25 parts of the solution. The air in the samples is replaced with nitrogen before capping tightly to prevent oxidation of the stannous ions. The samples are then stored at room temperature. The presence of glycerine retards the natural hydrolysis of the stannous ions and thus permits a better measure of the rate of absorption of the ions by the cleaning agent. At intervals the concentration of the stannous ions is determined iodimetrically. The compatibility is measured in terms of percent stannous ions remaining the sample (relative to the blank sample). Although determinations are made at intervals up to several months, the standard time for comparison is the percent stannous ions remaining after 3 weeks and, as herein used, the compatibility grade of a particular cleaning agent refers to the percent stannous ions remaining after 3 weeks according to the above described test.

It has been determined arbitrarily that the minimum compatibility grade, when high ionic compatibility is desired, is about 50%, preferably 70%. This grade can be compared with the grades of mineral cleaning agents commonly used in dentifrices as follows: Calcium pyrophosphate about 10%; alumina about 5%; dicalcium orthophosphate about 5%. Thus, the cleaning agents of this invention can be prepared to have a very high ionic compatibility. Even when the cleaning agents of this invention are not heat cured in step four, they have an ionic compatibility grade of about 20% to 30% which is superior to the best of the mineral cleaning agents.

The compatibility test above described is more rigorous than conditions ordinarily found in dentifrices. Stannous ions are used as a basis for determining ionic compatibility because they appear to be more sensitive, than any other ionic ingredient known for use in dentifrices, to reactivity with, or sorption by, cleaning agents. Compatibility of fluoride ions with the cleaning agents of this invention is also an important problem; but the fluoride ions do not appear to be as sensitive to incompatibility with the resinous cleaning agent of this invention as stannous ions. If a given resinous cleaning agent is compatible with stannous ions to a satisfactory degree, it will also be compatible with fluoride ions to a satisfactory extent.

The above-described compatibility test was made during the curing of a number of samples of particulate resins made by the process of this invention (under comparable conditions) wherein the resin was cured in step four at a number of temperatures within the above range of about 100° C. to about 180° C. and for varying lengths of time. For each temperature the minimum time of curing for the minimum acceptable ionic compatibility as defined about (about 50%, preferably 70%) was plotted; the plotted points were connected to form the curves shown in the graph in FIGURE two. Line A corresponds to the 50% compatibility; line B corresponds to the 70% compatibility. Thus, the preferred heat curing is defined as being at a time and temperature lying to the right of line A, preferably line B, in the graph in FIGURE two.

Although it is preferable to effect a heat cure in the fourth step of the process to insure a high degree of cleaning efficacy and to obtain a high degree of ionic compatibility in the cleaning agent of this invention, a cleaning agent with a high degree of cleaning efficacy and an acceptable degree of ionic compatibility (but without desirable high ionic compatibility) can be obtained in the practice of the process but omitting the preferred heat cure of step four. When the heat cure of step four is omitted it is usually desirable that the temperature of the acidulation step (step two) be in the range of about 70° C. to about 90° C. or that the temperature in the range of about 50° C. to about 85° C. be maintained for a longer-than-usual period of time, i.e., not less than about 15 minutes, but not more than about 60 minutes.

Additives can be included in the resin solution formed in step one of the process, if desired, to impart special characteristics to the resulting cleaning agent or special advantages to the process. However, such additives are not essential.

Thickening agents, such as natural or synthetic gums (e.g., Irish moss, gum arabic or sodium carboxymethyl cellulose), binders (e.g., colloidal magnesium aluminum silicate), or any soluble or dispersable agent that increases the viscosity of water, can be used to increase the friability of the acidified gel. Such agents are used in an amount in the range of about 0.1% to about 5% of the weight of the melamine-formaldehyde reaction product. However, such additives have a tendency to reduce the cleaning power and ionic compatibility of the finished particulate cleaning agent.

A second class of additives are soluble inorganic ionic salts. Such salts used in an amount of about 1% to about 10% by weight of the melamine-formaldehyde reaction product impart a moderate increase in the friability of the acidified gel. Such salts can also be useful in imparting a buffering action to the finished particulate cleaning agent. Ionic inorganic salts do not appear to affect the desired characteristics of the final cleaning agent. Examples of such salts are sodium chloride, sodium sulfate, potassium chloride, sodium nitrate, sodium fluoride, cuprous chloride, and cobaltous nitrate.

A third class of additives comprises very finely divided particles of hard substances of which inorganic minerals are outstanding examples. Such particles should be in the size range of about 0.5 micron to about 15 microns and have a hardness greater than about 2 on Mohs' scale. Examples of such minerals are silica (sand, ground glass, quartz), silicon carbide, pumice, alumina, ilmenite ($FeTiO_3$), $Fe_2O_3$ (hematite) and $TiO_2$.

When this third class of additives is used, the hard mineral particles are suspended in the resin solution of step one. The acidified melamine-formaldehyde reaction product coats the particles during the gel forming stage to form a particulate resin which has a core of hard, mineral substance. These "filled" resinous particles have a highly satisfactory cleaning utility in dentifrices. See copending application of William E. Cooley et al., Serial No. 115,327, filed June 7, 1961. The use of "filled" resinous particles permits the use of a lesser amount of resin to obtain a given quantity of cleaning agent; the core material is less expensive and more readily available than the resin. The hard mineral substance is added to, and uniformly mixed with, the resin solution of step one in an amount in the range of about 30% to about 90% by weight of the melamine-formaldehyde reaction product. In addition, the amounts of water in steps (1) and (2) are calculated on the basis of reaction product plus hard mineral substance instead of only reaction product; i.e., in step (1) the weight ratio of reaction product+hard mineral substance to water is in the range of about 1:1 to about 1:8; in step (2) the weight ratio of total water in the acidified mixture to the sum of the reaction product present and hard mineral substance added is in the range of about 1:1 to about 8:1. The reason for this difference in water calculation is the fact that the resin is coating existing nuclei of relatively large size. When such "filled" particles are made, it is preferable to substitute a relatively large amount of urea for the melamine in the initial reaction product.

Thus, in more precise terms, the processing of this invention comprises the steps of: (1) dissolving a water-soluble reaction product of melamine and formaldehyde in water, the molar ratio of formaldehyde to melamine in such a product being in the range of about 2:1 to about 4:1, and the weight ratio of the reaction product to water being in the range of about 1:1 to about 1:8; (2) acidifying the resulting solution at a temperature in the range of about 25° C. to about 100° C., preferably 50° C. to 85° C., to effect a polymerization of the reaction product in the form of a friable gel of ellipsoidal particles of polymerized reaction product, the size of the particles being in the range of about 1 micron to about 20 microns, the acidification being effected by adding acid in an amount equivalent, on a molar basis, (a) to HCl in a molar ratio range of about 0.2 mole to about 0.5 mole of HCl per mole of melamine in the case of mineral acids and (b) to acetic acid in a molar ratio range of about 0.35 mole to about 1.0 mole of acetic acid per mole of melamine in the case of organic acids and Brönsted acids, the weight ratio of total water in the acidified mixture to the reaction product present being in the range of about 1:1 to about 8:1; (3) removing water from the friable gel; (4) breaking up agglomerates of particulate polymerized reaction product. Preferably the particulate, acid-polymerized reaction product is heat cured in step 4 at a temperature in the range of about 100° C. to about 180° C. and at a time and temperature lying to the right of line A of the graph of FIGURE 2.

The cleaning agent of this invention is more precisely defined as ellipsoidal particles of a highly polymerized reaction product of melamine and formaldehyde, wherein the molar ratio of formaldehyde to melamine is in the range of about 2:1 to about 4:1, the size of the particles is in the range of about 1 micron to about 20 microns and the particles produce an acid reaction when slurried in pure neutral water, preferably a pH in the range of about 2.5 to about 5.5. Preferably the particles are spheroidal in shape. The particles have a cleaning grade of 4 or higher in the cleaning power test described in Example I and, in the case of the preferred heat cured particles an ionic compatibility greater than about 50%, preferably 70%, as determined by the compatibility test hereinbefore described.

The "filled" particles have the same characteristics except that they have a core of hard mineral substance as hereinbefore described.

*Example 1*

3000 parts of soluble melamine-formaldehyde resin (Resimene 817, a dry white powder, made by Monsanto Chemical Co.) having a molar ratio of formaldehyde to melamine ranging from 2:1 to 3:1 and 150 parts of sodium chloride were dissolved in 7000 parts of water and heated to 60° C. A solution of 240 parts of concentrated nitric acid in 6500 parts of water at 60° C. was poured rapidly into the resin solution. The molar ratio of $HNO_3$ to melamine was estimated to be 0.23:1. The final ratio of water to resin was 4.5:1. The resulting mixture was stirred with two revolutions of a spatula and the swirling of the mixture was stopped quickly by lowering into the mixture a radiating set of baffle plates. In about a minute the liquid suddenly turned opaque white as the resin gel began to form. After 10 minutes the gel was firm, and it was cut into sections and removed from the mixing vessel. Water was then pressed from the gel, after which the gel was dispersed in fresh water and filtered. The filtered gel was spread in a thin layer and dried in an oven at 100° C. After drying, the resin easily crumbled to a dry powder between the fingers. The dried resin was then cured, also in a thin layer in an oven, at 110° C. for 16 hours. The cured resin, consisting of agglomerates of small particles, was placed in a small laboratory ball mill, having ½ inch diameter porcelain balls, and milled for sixteen hours. The finished resinous cleaning agent had a particle size ranging from 5 to 15 microns with no agglomerates larger in size than 20 microns. The particles were spheroidal. A slurry of the particulate resin in pure neutral water had a pH of 3.2. The particles had an ionic compatibility rating of 80%. The particles had a cleaning grade of 8 as determined by the following test:

White polyester plastic blocks having a surface measuring 10 mm. x 12 mm. were ground smooth. The blocks were washed and dried. One drop of ethyl acetate was placed on the level, dry, dust-free surface and allowed to spread. Then three drops of a mixture consisting of 2 parts ethyl acetate and one part of black lacquer (FoMoCo-Color Patch, Black M-1724, made by the Ford Motor Company, or Sheffield High Gloss, made by The Sheffield Bronze Paint Corp.) were applied. In one minute the lacquer dried to a tacky surface and drying was completed in three ten-minute stages. The blocks were covered with metal cans for the first stage; the cans were tilted to allow partial access of room air currents during the second stage, and the cans were removed for the third stage. Such a drying process gave uniform and reproducible films. The blocks were heated for ten minutes, 10 inches below a heat lamp, and then cooled. The blocks were prepared in sets of 50 to 100. The blocks were inserted in slurries of cleaning agents to be tested and brushed by toothbrushes moving back and forth across the face of the block. The slurries of test materials were of equal viscosity (70 cps. at room temperature). Equal viscosities were used rather than equal weights of test materials in order to approximate more closely the conditions which would be encountered when using the cleaning material being tested in a toothpaste. The blocks were brushed 3000 double strokes. Reflectance measurements were then taken with a Photovolt Reflectometer on the brushed surface.

The sets of blocks were standardized by measuring the cleaning power of standard $Ca_2P_2O_7$ and $CaHPO_4 \cdot 2H_2O$). The reflectance measurement obtained on a block brushed with $Ca_2P_2O_7$ was assigned a cleaning grade of 8, and that for $CaHPO_4 \cdot 2H_2O$ was set at 5. On a plot of reflectance measurements vs. cleaning grade a curve fitted to these points as references and also passing through the origin was used for converting reflectance measurements to cleaning grades for all the blocks in the set. The cleaning grades run from 0 to 10 on the scale thus established.

In the process of Example I, the nitric acid can be replaced by hydrochloric acid, or sulfuric acid in molar equivalent amounts with substantially the same results.

In Example I the sodium chloride can be omitted from the process with no change in the process or the resulting product except that the gel formed in the acidulation step will be slightly less friable and the final product will have a pH in the water slurry of 2.5.

Example II

The process of Example I was repeated with the following exceptions; the acidulation was carried on at 70° C.; the gel was permitted to cool to room temperature in the reaction vessel; the curing step was omitted. The resulting particulate resin had cleaning effectiveness equally as good as the product of Example I. However, the ionic compatibility of the product of Example II was below the arbitrary minimum compatibility grade for use in a stannous fluoride containing dentifrice (50%). The product of Example II has outstanding utility as the essential cleaning agent in a dentifrice. This product also has acceptable ionic compatibility for a fluoride-containing dentifrice, particularly one in which the fluoride ions are supplied by a fluoride other than stannous fluoride. Even in a stannous fluoride dentifrice, the product of Example II has ionic compatibility superior to mineral abrasives.

Example III 100 parts of the soluble melamine formaldehyde resin described in Example I were dissolved in 350 parts of water and heated to 60° C. 23.5 parts of glacial acetic acid at 60° C. was poured rapidly into the resin solution. The molar ratio of acetic acid to melamine was estimated to be 0.76:1. The resulting mixture was stirred to effect a uniform mixture. The movement of the mixture was stopped. The mixture set up into a gel. After 10 minutes the gel was firm and it was cut into sections and removed from the mixing vessel. Water was then pressed from the gel after which the gel was dispersed in fresh water and filtered. The filtered gel was spread in a thin player and dried in an oven at 100° C. After drying the resin was cured in thin layers in an oven at 110° C. for 16 hours. The cured resin, consisting of agglomerates of small spheroidal particles, was placed in a ball mill, ½-inch diameter porcelain balls, and milled for 16 hours.

The finished resinous cleaning agent had a particle size predominantly of 5 microns with no agglomerates larger in size than 20 microns. A slurry of the particulate resin in water had an acidic pH. The particles had an ionic compatibility rating of 75% and a cleaning grade of 7.

Citric acid, lactic acid, tartaric acid, maleic acid, malonic acid, gluconic acid or ammonium chloride can be substituted for the acetic acid in Example II in molar equivalent amounts with substantially the same results.

Example IV 100 parts of a commercial, water-soluble melamine-urea-formaldehyde resin (Resin TS5913, a dry white powder made by the Monsanto Chemical Co.) estimated to have a melamine:urea:formaldehyde ratio of 1:1:4.5 were dissolved in 250 parts of water at 60° C. A solution of 10 parts of concentrated nitric acid in 200 parts of water at 60° C. was poured into and mixed with the resin solution. The molar ratio of $HNO_3$ to melamine+urea was estimated to be 0.3:1. Movement of the mixture was stopped and after 2 minutes the mixture set up in a gel. After 2 minutes the gel was firm and it was cut up into sections and removed from the mixing vessel. The resin was cured at 150° C. for 16 hours. (Water was removed from the gel in the first part of the cure.) The cured resin was then placed in a ball mill having ½ porcelain balls and milled for 16 hours. The finished spheroidal particles had a size predominantly of 10 microns with no agglomerates of particles larger in size than 20 microns. A slurry of the particulate resin in water had an acidic pH. The particles had an ionic compatibility rating of 60% and a cleaning grade of 8.

Example V 90 parts of the soluble melamine-formaldehyde resin of Example I were dissolved in 750 parts of water. To this solution was added 600 parts of powdered silica having a particle size predominantly in the range of 4 to 7 microns. (Silica has a hardness of Mohs' scale of 7.) The aqueous mixture of resin solution and suspended silica was heated to 60° C. To this mixture was added 9 parts of concentrated nitric acid. The molar ratio of $HNO_3$ to melamine was estimated to be 0.29:1. Movement of the acidified mixture was stopped and the mixture set up in a gel. After 45 minutes the gel was cut up into sections and removed from the mixing vessel. Water was then pressed from the gel after which the gel was dispersed in aqueous alcohol and filtered. The filtered gel was spread in a thin layer and air dried. The dried resin was then oven cured at 110° C. for one hour. The cured resin was placed in a ball mill having ½-inch porcelain balls and milled for 2 hours. The milling effected a break-up of the agglomerated particles; there was no fracturing of the individual "filled" particles. The finished "silica filled" resinous cleaning agent had a particle size predominantly in the range of 5 to 10 microns with no aggregates larger in size than 20 microns. The particles were spheroidal. A slurry of the particles in water had a pH of 4. The particles had an ionic compatibility rating of 70%. The particles had a cleaning grade of 8+.

Finely divided silicon carbide, pumice, alumina or $TiO_2$ can be substituted for silica in Example V in equal amounts with substantially equal results.

The particulate polymerized melamine-formaldehyde resin of this invention (including the "filled" resin) finds its greatest utility as the essential cleaning agent in dentrifices. Dentrifices can be compounded in a number of cosmetically acceptable forms, e.g., powder or paste. Toothpastes usually contain a humectant, a sudser, a binder, a sweetener, and a flavor in addition to the cleaning agent. Examples of humectants are glycerine and sorbitol. Examples of sudsers are sodium lauryl sulfate, sodium coconut monoglyceride sulfonate, sucrose monolaurate and the condensation product of dodecyl alcohol with 1 to 6 moles of ethylene oxide. Examples of binders are sodium carboxymethyl cellulose, hydroxyethyl cellulose and very high molecular weight polyethylene oxides.

In a toothpaste the cleaning agent constitutes from about 20% to about 50%, preferably 30% to 40%, of the composition. In a tooth powder higher proportions of cleaning agent, up to about 95%, are used.

Preferably, dentifrices containing the cleaning agent of this invention also contain fluoride ions. In such case the cleaning agent should have the high ionic compatibility obtainable by heat curing as described above. Fluoride ions can be supplied by any water-soluble innocuous compound of fluoride which provides fluoride ions on contact with water. By innocuous is meant a compound which is not undesirably toxic, highly colored, or otherwise objectionable for use in a dentifrice. Examples of suitable water-soluble fluoride compounds are sodium fluoride, potassium fluoride, ammonium fluoride, indium fluoride, palladium fluoride, ferrous fluoride, lithium fluoride, fluorosilicates, e.g., $Na_2SiF_6$, fluorozirconates, e.g., $Na_2ZrF_6$, fluoroborates, e.g., $NaBF_4$ and fluorotitanates.

Preferred fluorides are those which contain stannous ions for they provide the beneficial effects of both fluoride ions and stannous ions. Examples of suitable stannous fluorides are stannous fluoride itself, mixed halides such as $SnClF$ and $Sn_2ClF_3$, and fluorostannites such as $KSnF_3$. It is also suitable to supply stannous ions from a compound other than a fluoride, e.g., stannous chloride or stannous nitrate.

It is not necessary that the fluoride ions be supplied by an inorganic salt. They may be supplied by an organic fluoride which is soluble in water or at least which dissociates to give fluoride ions in contact with water. The fluoride ions can also be supplied by organic hydrofluorides. Suitable amine fluorides disclosed in Canadian Patent 543,066 are the mono, di-, and tri-ethanolamine hydrofluorides. These compounds can also be named as the corresponding ethanol ammonium fluorides. Other useful organic fluorides and hydrofluorides are disclosed in Canadian Patent 594,553 and in a publication by H. R. Mühlemann et al. in Helvetica Odontologica Acta, vol. I, No. 2, page 23, (1957).

Fluoride ions, if present in the dentifrice, should be at a level in the range of about 25 p.p.m. to about 4000 p.p.m. Preferably the fluoride level is from 500 p.p.m. to 2500 p.p.m. If stannous ions are to be present in the dentifrices, they are used at a level of from about 1000 p.p.m. to about 9000 p.p.m., preferably at a level of from 2000 p.p.m. to 4000 p.p.m.

Dentifrices containing fluoride ions should have a pH in the range of about 3 to about 7, preferably about 4.5 to 7. When stannous ions are present in the dentifrice the pH is preferably in the range of about 3.5 to about 5.

Example VI

A toothpaste was formulated by mixing together the following ingredients:

| Ingredient | Parts |
|---|---|
| Glycerine | 350.0 |
| Hydroxyethyl cellulose | 27.0 |
| Color | 7.05 |
| Flavor | 12.75 |
| Stannous fluoride | 6.00 |
| Saccharin | 2.70 |
| Water | 485.0 |
| Particulate highly polymerized melamine formaldehyde reaction product as described in Example I | 510.0 |

The toothpaste had a pH of 3.5. Its texture was excellent. Its cleaning ability was equal to or superior to widely marketed commercial toothpastes made with mineral abrasives. After five months of storage, 58% of the original stannous ions were still active in the paste. The particulate resins prepared in Examples III, IV and V can also be used in the above dentifrice with substantially equal results.

If sodium fluoride or triethanolamine fluoride are substituted for the stannous fluoride in the above dentifrice, outstanding fluoride ion compatibility can be observed.

While particulate resinous cleaning agent of this invention finds its greatest utility in dentifrices (toothpastes and tooth powders), it also has outstanding utility in other cleaning products such as powdered scouring cleansers, hand soaps (e.g., "Lava" soap), metal polishes, automobile cleaners, scouring pads and the like.

What is claimed is:

1. The process of producing a particulate resinous cleaning agent comprising the steps of: (1) forming an aqueous solution of a water-soluble reaction product of melamine and formaldehyde, the molar ratio of formaldehyde to melamine in said reaction product being in the range of about 2:1 to about 4:1, and the weight ratio of the said reaction product to water being in the range of about 1:2.3 to about 1:3.5; (2) acidifying the resulting solution at a temperature in the range of 50° C. to 85° C. with agitation in an amount no more than that sufficient to provide a substantially uniform mixture, followed by reduction of internal movement of the acidified mixture, to effect a polymerization of the said reaction product in the form of a friable gel of ellipsoidal particles of polymerized reaction product in not more than about 15 minutes, the size of the particles being in the range of about 1 micron to about 20 microns, the acidification being effected by adding acid in an amount equivalent, on a molar basis, (a) to HCl in a molar ratio range of about 0.2 mole to about 0.5 mole of HCl per mole of melamine in the case of mineral acids and (b) to acetic acid in a molar ratio range of about 0.35 mole to about 1.0 mole of acetic acid per mole of melamine in the case of organic acids and Brönsted acids, the weight ratio of total water in the acidified mixture to the polymerized reaction product present being in the range of about 1:1 to about 8:1; (3) physically removing water from the said friable gel; (4) comminuting agglomerates of particular polymerized reaction product to form said cleaning agent, substantially all remaining agglomerates being smaller in size than about 30 microns.

2. The process of claim 1 in which at any stage in step (4) the particulate polymerized reaction product is subjected to a heat cure at temperatures in the range of about 100° C. to about 180° C. and at a time and temperature lying to the right of line A of the graph of FIGURE 2.

3. The process of claim 2 in which the temperature of step (2) is in the range of 60° C. to 70° C. and in which the heat cure of step (4) is at a time and temperature lying to the right of line B of the graph of FIGURE 2.

4. The process of claim 2 in which urea is substituted for the said melamine in an amount up to about 80% by weight of the said melamine.

5. The process of claim 2 in which the said heat cure is effected after the breaking up of the said agglomerates.

6. The process of producing a particulate resinous cleaning agent comprising the steps of: (1) forming an aqueous solution of a water-soluble reaction product of melamine and formaldehyde, the molar ratio of formaldehyde to melamine in said reaction product being in the range of about 2:1 to about 4:1, and adding to the resulting solution a particulate, insoluble, inert, hard, inorganic mineral substance which has a hardness greater than about 2 on Mohs' scale and a particle size in the range of about 0.5 micron to about 15 microns, said substance being added in an amount from about 30% to about 90% by weight of the said reaction product, the weight ratio of the said reaction product+said substance to water being in the range of about 1:1 to about 1:8; (2) acidifying the said solution at a temperature in the range of about 25° C. to about 100° C. to effect a polymerization of the said reaction product in the form of a friable gel of ellipsoidal particles of polymerized reaction product, the size of the particles being in the range of about 1 micron to about 20 microns, the acidification being effected by adding acid in an amount equivalent, on a molar basis, (a) to HCl in a molar ratio range of about 0.2 mole to about 0.5 mole of HCl per mole of melamine in the case of mineral acids and (b) to acetic acid in a molar ratio range of about 0.35 mole to about 1.0 mole of acetic acid per mole of melamine in the case of organic acids and Brönsted acids, the weight ratio of total water in the acidified mixture to the sum of the polymerized reaction product present+hard mineral substance added being in the range of about 1:1 to about 8:1; (3) physically removing water from the said friable gel; (4) comminuting agglomerates of particulate polymerized reaction product to form said cleaning agent, substantially all remaining agglomerate being smaller in size than about 30 microns.

7. The process of claim 6 in which at any stage in step (4) the particulate polymerized reaction product is subjected to a heat cure at a temperature in the range of about 100° C. to about 180° C. and at a time and temperature lying to the right of line A of the graph of FIGURE 2.

8. The process of claim 7 in which urea is substituted for the said melamine in an amount up to about 80% by weight of the said melamine and in which the temperature of step (2) is in the range of 50° C. to 85° C.

References Cited by the Examiner
UNITED STATES PATENTS

| | | | |
|---|---|---|---|
| 2,130,034 | 9/1938 | Schmidt | 167—93 |
| 2,327,968 | 8/1943 | Ripper | 260—67.6 |
| 2,345,543 | 3/1944 | Wohnsiedler et al. | 260—67.6 |
| 2,485,079 | 10/1949 | Wohnsiedler et al. | 260—67.6 XR |
| 2,485,080 | 10/1949 | Wohnsiedler et al. | 260—67.6 XR |
| 2,662,872 | 12/1953 | Gagarine | 260—67.6 |
| 2,662,873 | 12/1953 | Kaess | 260—67.6 |
| 2,708,622 | 5/1955 | Stone | 51—293 |
| 2,878,111 | 3/1959 | Daniels | 51—293 |
| 2,901,400 | 8/1959 | Thomas | 167—93 |
| 3,070,510 | 12/1962 | Cooley et al. | 167—93 |
| 3,151,027 | 9/1964 | Cooley et al. | 260—39 |

MORRIS LIEBMAN, *Primary Examiner.*

MORRIS O. WOLK, *Examiner.*